US011182432B2

(12) United States Patent
Shi et al.

(10) Patent No.: US 11,182,432 B2
(45) Date of Patent: Nov. 23, 2021

(54) VERTICAL PROCESSING OF NATURAL LANGUAGE SEARCHES

(71) Applicant: Microsoft Technology Licensing, LLC, Redmond, WA (US)

(72) Inventors: Jun Shi, Fremont, CA (US); Huiji Gao, Sunnyvale, CA (US); Ying Xiong, Belmont, CA (US); Michaeel M. Kazi, Foster City, CA (US); Yu Gan, Mountain View, CA (US); Yu Liu, Santa Clara, CA (US); Xiaowei Liu, Mountain View, CA (US); Gonzalo Jorge Aniano Porcile, Sunnyvale, CA (US); Bo Long, Palo Alto, CA (US); Abhimanyu Lad, Foster City, CA (US); Liang Zhang, Fremont, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 208 days.

(21) Appl. No.: 16/457,222

(22) Filed: Jun. 28, 2019

(65) Prior Publication Data

US 2020/0410011 A1   Dec. 31, 2020

(51) Int. Cl.
*G06F 17/00* (2019.01)
*G06F 16/9032* (2019.01)
*G06N 20/00* (2019.01)
*G06F 16/2457* (2019.01)
*G06F 40/30* (2020.01)

(52) U.S. Cl.
CPC .. *G06F 16/90332* (2019.01); *G06F 16/24578* (2019.01); *G06F 40/30* (2020.01); *G06N 20/00* (2019.01)

(58) Field of Classification Search
None
See application file for complete search history.

(56) References Cited

U.S. PATENT DOCUMENTS

| 2017/0249309 A1* | 8/2017 | Sarikaya | G06F 40/35 |
| 2018/0052824 A1* | 2/2018 | Ferrydiansyah | G06F 40/30 |
| 2019/0087455 A1* | 3/2019 | He | G06F 40/253 |
| 2021/0097374 A1 | 4/2021 | Liu et al. | |

OTHER PUBLICATIONS

Pennington, et al., "GloVe: Global Vectors for Word Representation", Retrieved from: https://nlp.stanford.edu/projects/glove/, Aug. 2014, 3 Pages.

* cited by examiner

*Primary Examiner* — Satwant K Singh
(74) *Attorney, Agent, or Firm* — Schwegman Lundberg & Woessner, P.A.

(57) ABSTRACT

The disclosed embodiments provide a system for performing a natural language search. During operation, the system applies a first machine learning model to a natural language query to predict one or more search intentions associated with the natural language query. Next, the system applies a second machine learning model to the natural language query to produce one or more search parameters associated with a first intention in the search intention(s), wherein the search parameter(s) include a field and a value of the field. The system then performs a first search of a first vertical associated with the first intention using the search parameter(s). Finally, the system generates a ranking containing a first set of search results from the first search of the first vertical and outputs at least a portion of the ranking in a response to the natural language query.

20 Claims, 4 Drawing Sheets

VERTICAL PROCESSING OF NATURAL LANGUAGE SEARCHES

BACKGROUND

Field

The disclosed embodiments relate to natural language search. More specifically, the disclosed embodiments relate to techniques for performing vertical processing of natural language searches.

Related Art

Online networks commonly include nodes representing individuals and/or organizations, along with links between pairs of nodes that represent different types and/or levels of social familiarity between the entities represented by the nodes. For example, two nodes in an online network are connected as friends, acquaintances, family members, classmates, and/or professional contacts. Online networks may further be tracked and/or maintained on web-based networking services, such as online networks that allow the individuals and/or organizations to establish and maintain professional connections, list work and community experience, endorse and/or recommend one another, promote products and/or services, and/or search and apply for jobs.

In turn, online networks may facilitate activities related to business, recruiting, networking, professional growth, and/or career development. For example, professionals use an online network to locate prospects, maintain a professional image, establish and maintain relationships, and/or engage with other individuals and organizations. Similarly, recruiters use the online network to search for candidates for job opportunities and/or open positions. At the same time, job seekers use the online network to enhance their professional reputations, conduct job searches, reach out to connections for job opportunities, and apply to job listings. Consequently, use of online networks may be increased by improving the data and features that can be accessed through the online networks.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

The disclosed embodiments provide a method, apparatus, and system for processing natural language searches. Each natural language search includes a phrase, sentence, or question that follows human language rules instead of specifying keywords or search terms that are matched to search results. For example, natural language searches includes queries such as "show me software engineer jobs," "what skills do software engineers have?" "which of my connections are software engineers?" and "who can refer me to software engineer jobs?"

More specifically, the disclosed embodiments provide a method, apparatus, and system for performing vertical processing of natural language searches. In these embodiments, an online system includes multiple verticals that return different types of search results in response to queries. For example, an online network includes verticals that search for and/or retrieve information related to people, jobs, companies, schools, groups, events, videos, audio, images, content, sales, marketing, hiring, educational technology, and/or other entities in the online network.

During a natural language search, a natural language query from a user is matched to one or more search intentions. For example, an intent model is applied to the natural language query to produce a set of predicted likelihoods that the natural language query contains a set search of intentions, with the predicted likelihoods summing to 1.

Each search intention represents a type of search to be performed using the natural language query. For example, each search intention represents a vertical in the online system with which searches can be performed. In the context of an online network, search intentions and/or verticals include, but are not limited to, people, jobs, companies, content, schools, groups, hiring, sales, marketing, and/or other products offered by or through the online network. The search intentions also include an ambiguous intention representing a lack of a clear search intention in the natural language query and/or an out-of-scope intention representing a search intention that is cannot be processed by a vertical and/or component in the online system.

Next, the natural language query is converted into a set of search parameters for each vertical represented by a corresponding search intention identified in the natural language query. For example, a natural language query of "Who can refer me to a software engineer job?" is matched to two search intentions related to people and jobs in an online network. One machine learning model is applied to the natural language query to extract a set of search parameters for a first vertical related to people in the online network, and another machine learning model is applied to the natural language query to extract a different set of search parameters for a second vertical related to jobs in the online network. Additional machine learning models are optionally applied to the natural language query to extract additional search parameters for other verticals in the online network, even if search intentions related to the verticals are not detected in substantial amounts in the natural language query. Each set of search parameters includes one or more fields representing entities associated with the vertical and values of the field(s) from the natural language query.

Each set of search parameters is then used to perform a search of the corresponding vertical. For example, the search parameters are used to construct a keyword query that can be processed by the vertical and/or a search module in the vertical, and a set of search results is obtained from the vertical and/or search module in response to the keyword query.

Multiple sets of search results from multiple verticals are then combined into a ranking, which is outputted in response to the natural language query. For example, an additional machine learning model is applied to the search results to generate scores representing the relevance of each search result to the user and/or the likelihood of a positive outcome between the user and each search result. The search results are ranked by descending score, and a set of rules is used to filter, reorder, and/or otherwise update the ranking. A subset of the highest-ranked search results is then outputted in response to the natural language query.

By identifying search intentions associated with natural language queries and matching the search intentions to verticals that are used to generate results related to the natural language queries, the disclosed embodiments adapt natural language search to online systems with data and/or functionality provided by different components or features of the online systems. In turn, users are able to express their searches and/or search intentions using natural language phrases and/or sentences, which reduces ambiguity in the users' searches and/or complexity in searching the online systems. In addition, the use of machine learning models to extract search parameters related to each vertical from the natural language queries allows the search parameters to be adapted to the context of each vertical. Combining search results from multiple verticals into a single ranking that is returned in response to each natural language query further allows users to efficiently perform natural language searches across the components and/or features of the online systems instead of using multiple queries and/or search modules to search different components and/or features of the online systems.

In contrast, conventional techniques lack the ability to perform natural language searches of online systems that provide different sets of features, data, and/or search results using separate verticals and/or components. Instead, the conventional techniques perform keyword searches of the online systems, which return ambiguous or irrelevant search results when keywords entered in the searches by users apply to multiple entities and/or search intentions. When a user receives search results for a keyword search that lack relevance to the user's search intentions, the user may be required to repeatedly reformulate the keyword search and resubmit the keyword search to an online system until the relevance of the search results improve. In turn, the online system incurs additional computational overhead in processing the additional keyword searches, which reduces the online system's bandwidth and/or ability to perform other types of processing.

The conventional techniques also, or instead, allow the users to perform structured searches, in which the users interact with drop-down menus, checkboxes, radio buttons, form fields, sliders, and/or other user-interface elements to specify the types of data to search and/or values, ranges of values, filters, and/or other representations of entities that are found in the data. Such structured searches involve user interaction with unintuitive and/or difficult-to-use user-interface elements and require additional computational resources and/or bandwidth to generate the user-interface elements and/or process input received through the user-interface elements. Consequently, the disclosed embodiments improve computer systems, applications, user experiences, tools, and/or technologies related to performing and/or processing searches.

Vertical Processing of Natural Language Searches

Figure 1:
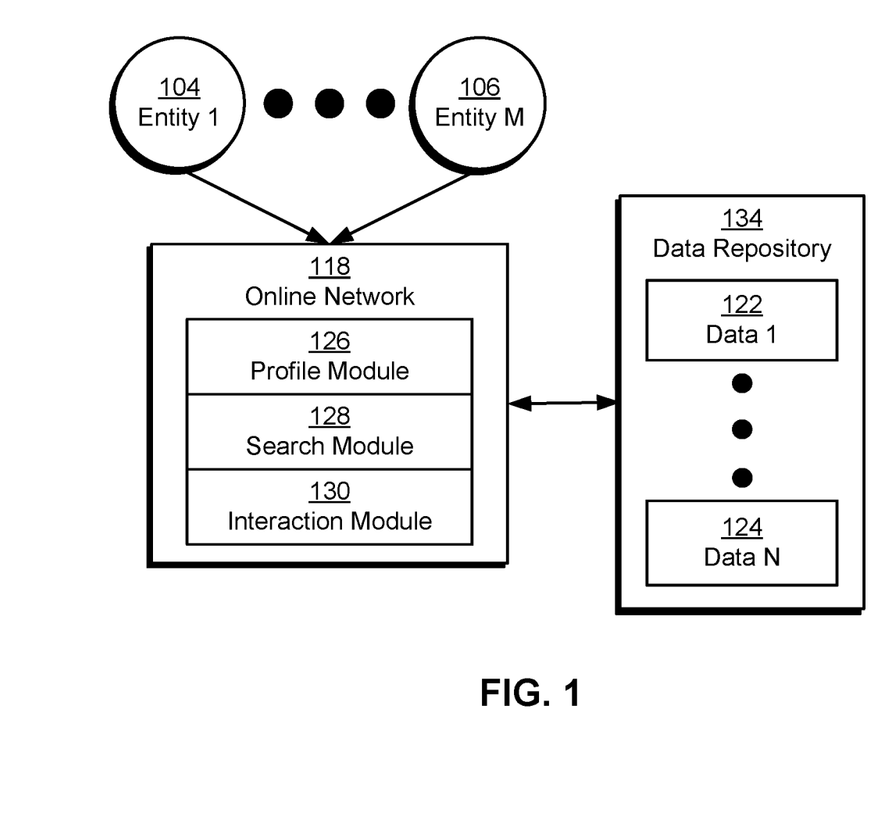
FIG. 1 shows a schematic of a system in accordance with the disclosed embodiments.

FIG. 1 shows a schematic of a system in accordance with the disclosed embodiments. As shown in FIG. 1, the system includes an online network 118 and/or other user community. For example, online network 118 includes an online professional network that is used by a set of entities (e.g., entity 1 104, entity x 106) to interact with one another in a professional and/or business context.

The entities include users that use online network 118 to establish and maintain professional connections, list work and community experience, endorse and/or recommend one another, search and apply for jobs, and/or perform other actions. The entities also, or instead, include companies, employers, and/or recruiters that use online network 118 to list jobs, search for potential candidates, provide business-related updates to users, advertise, and/or take other action.

Online network 118 includes a profile module 126 that allows the entities to create and edit profiles containing information related to the entities' professional and/or industry backgrounds, experiences, summaries, job titles, projects, skills, and so on. Profile module 126 also allows the entities to view the profiles of other entities in online network 118.

Profile module 126 also, or instead, includes mechanisms for assisting the entities with profile completion. For example, profile module 126 may suggest industries, skills, companies, schools, publications, patents, certifications, and/or other types of attributes to the entities as potential additions to the entities' profiles. The suggestions may be based on predictions of missing fields, such as predicting an entity's industry based on other information in the entity's profile. The suggestions may also be used to correct existing fields, such as correcting the spelling of a company name in the profile. The suggestions may further be used to clarify existing attributes, such as changing the entity's title of "manager" to "engineering manager" based on the entity's work experience.

Online network 118 also includes a search module 128 that allows the entities to search online network 118 for people, companies, jobs, and/or other information maintained by online network 118. For example, the entities input one or more keywords into a search bar to find profiles, job postings, job candidates, articles, and/or other information that includes and/or otherwise matches the keyword(s). The entities may additionally use an "Advanced Search" feature in online network 118 to search for profiles, jobs, and/or information by categories such as first name, last name, title, company, school, location, interests, relationship, skills, industry, groups, salary, experience level, etc.

Online network 118 further includes an interaction module 130 that allows the entities to interact with one another on online network 118. For example, interaction module 130 may allow an entity to add other entities as connections, follow other entities, send and receive emails or messages with other entities, join groups, and/or interact with (e.g., create, share, re-share, like, and/or comment on) posts from other entities.

Those skilled in the art will appreciate that online network 118 may include other components and/or modules. For example, online network 118 may include a homepage, landing page, and/or content feed that provides the entities the latest posts, articles, and/or updates from the entities' connections and/or groups. Similarly, online network 118 may include features or mechanisms for recommending connections, job postings, articles, and/or groups to the entities.

In one or more embodiments, data (e.g., data 1 122, data x 124) related to the entities' profiles and activities on online network 118 is aggregated into a data repository 134 for subsequent retrieval and use. For example, each profile update, profile view, connection, follow, post, comment, like, share, search, click, message, interaction with a group, address book interaction, response to a recommendation, purchase, and/or other action performed by an entity in online network 118 is tracked and stored in a database, data warehouse, cloud storage, and/or other data-storage mechanism providing data repository 134.

In one or more embodiments, search module 128 and/or online network 118 support natural language searches related to data in data repository 134 and/or entities in online network 118. For example, search module 128 includes functionality to accept natural language queries that include phrases, sentences, and/or questions that follow human language rules instead of containing keywords that are matched to search results. Search module 128 and/or other components of online network 118 additionally include functionality to match different components of each natural language query to search parameters associated with named entities and/or verticals in online network 118 and generate search results based on the values of the search parameters, as described in further detail below.

Figure 2:
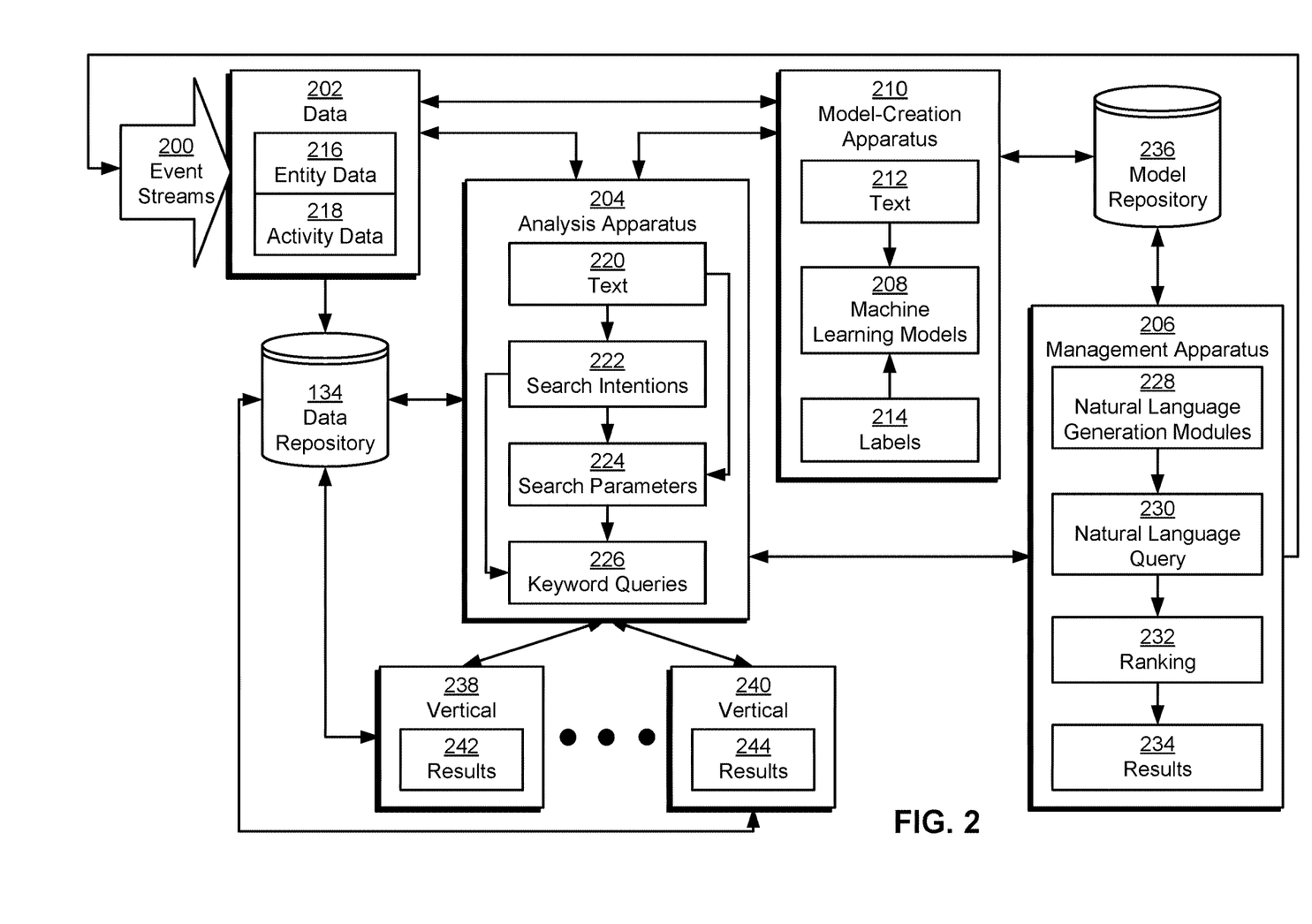
FIG. 2 shows a system for processing natural language searches in accordance with the disclosed embodiments.

FIG. 2 shows a system for processing natural language searches in accordance with the disclosed embodiments. For example, the system is implemented using search module 128 and/or other components of online network 118 of FIG. 1. The system includes an analysis apparatus 204, a model-creation apparatus 210, and a management apparatus 206. Each of these components is described in further detail below.

As mentioned above, the system includes functionality to perform natural languages searches using data 202 in data repository 134, which includes entity data 216 related to named entities in an online system (e.g., online network 118 of FIG. 1), as well as activity data 218 that tracks activity related to the named entities within and/or outside the online system.

Entity data 216 includes attributes associated with entities in the online system. For example, entities in an online professional network include people, companies, schools, groups, jobs, posts, articles, advertisements, events, courses, images, audio, video, locations, and/or other representations of data 202 and/or content in the online professional network.

Continuing with the above example, attributes associated with people include profile data for members of the online system, such as demographic (e.g., gender, age range, nationality, location, language), professional (e.g., job title, professional summary, professional headline, employer, industry, experience, skills, seniority level, professional endorsements), social (e.g., organizations to which the user belongs, geographic area of residence), and/or educational (e.g., degree, university attended, certifications, licenses) attributes. Attributes associated with jobs include the jobs' functions, roles, titles, industries, seniorities, locations, required skills, responsibilities, salary ranges, benefits education levels, and/or other fields that describe or are related to the jobs.

In some embodiments, attributes of people, jobs, and/or other entities are matched to a number of segments, with each segment containing a group of entities that share one or more common attributes. For example, member segments in the online system are defined to include members with the same industry, title, location, and/or language. In another example, job segments of jobs in the online system include groups of jobs that share the same attributes. These job attributes include, but are not limited to, locations or regions of the jobs (e.g., states within the United States); languages, industries, seniorities, education, experience levels, skills, and/or titles associated with the jobs; sources of applications for the jobs (e.g., a jobs module or other onsite source within the online system or a company website or another offsite source that is external to the online system); and/or payment models for the jobs (e.g., pay per click (PPC) or a prepaid fixed price throughout the job's lifetime).

Connection information in entity data 216 is optionally combined into a graph, with nodes in the graph representing entities (e.g., users, schools, companies, locations, etc.) in the online system. Edges between the nodes in the graph represent relationships between the corresponding entities, such as connections between pairs of members, education of members at schools, employment of members at companies, following of a member or company by another member, business relationships and/or partnerships between organizations, and/or residence of members at locations.

Activity data 218 includes records of interactions among users, entities, and/or content associated with the online system. For example, activity data 218 tracks impressions, clicks, likes, dislikes, shares, hides, comments, posts, updates, conversions, and/or other user interaction with content in the online system. Activity data 218 also, or instead, tracks other types of activity, including connections, messages, job applications, job searches, recruiter searches for candidates, interaction between candidates and recruiters, and/or interaction with groups or events. In some embodiments, activity data 218 further includes social validations of skills, seniorities, job titles, and/or other profile attributes, such as endorsements, recommendations, ratings, reviews, collaborations, discussions, articles, posts, comments, shares, and/or other member-to-member interactions that are relevant to the profile attributes. Activity data 218 additionally includes schedules, calendars, and/or upcoming availabilities of the users, which may be used to schedule meetings, interviews, and/or events for the users. Like entity data 216, activity data 218 is optionally used to create a graph, with nodes in the graph representing entities and/or content and edges between pairs of nodes indicating actions taken by the entities, such as creating or sharing articles or posts, sending messages, sending or accepting connection requests, endorsing or recommending one another, writing reviews, applying to opportunities, joining groups, and/or following other entities.

In one or more embodiments, some or all entity data 216, activity data 218, and/or other data 202 in data repository 134 is standardized before the data is used by components of the system. For example, skills associated with member profiles, jobs, courses, and/or other entities are organized into a hierarchical taxonomy that is stored in data repository 134 and/or another repository. The taxonomy models relationships between skills (e.g., "Java programming" is related to or a subset of "software engineering") and/or standardize identical or highly related skills (e.g., "Java programming," "Java development," "Android development," and "Java programming language" are standardized to "Java").

In another example, locations in data repository 134 include cities, metropolitan areas, states, countries, continents, and/or other standardized geographical regions. Like standardized skills, the locations can be organized into a hierarchical taxonomy (e.g., cities are organized under states, which are organized under countries, which are organized under continents, etc.).

In a third example, data repository 134 includes standardized company names for a set of known and/or verified companies associated with the members and/or jobs. In a fourth example, data repository 134 includes standardized titles, seniorities, and/or industries for various jobs, members, and/or companies in the online system. In a fifth example, data repository 134 includes standardized time periods (e.g., daily, weekly, monthly, quarterly, yearly, etc.) that can be used to retrieve profile data 216, user activity 218, and/or other data 202 that is represented by the time periods (e.g., starting a job in a given month or year, graduating from university within a five-year span, job listings posted within a two-week period, etc.). In a sixth example, data repository 134 includes standardized job functions such as "accounting," "consulting," "education," "engineering," "finance," "healthcare services," "information technology," "legal," "operations," "real estate," "research," and/or "sales."

In some embodiments, standardized attributes in data repository 134 are represented by unique identifiers (IDs) in the corresponding taxonomies. For example, each standardized skill is represented by a numeric skill ID in data repository 134, each standardized title is represented by a numeric title ID in data repository 134, each standardized location is represented by a numeric location ID in data repository 134, and/or each standardized company name (e.g., for companies that exceed a certain size and/or level of exposure in the online system) is represented by a numeric company ID in data repository 134.

Data 202 in data repository 134 can be updated using records of recent activity received over one or more event streams 200. For example, event streams 200 are generated and/or maintained using a distributed streaming platform such as Apache Kafka (Kafka™ is a registered trademark of the Apache Software Foundation). One or more event streams 200 are also, or instead, provided by a change data capture (CDC) pipeline that propagates changes to data 202 from a source of truth for data 202. For example, an event containing a record of a recent profile update, job search, job view, job application, response to a job application, connection invitation, post, like, comment, share, and/or other recent member activity within or outside the online system is generated in response to the activity. The record is then propagated to components subscribing to event streams 200 on a nearline basis.

Management apparatus 206 includes functionality to receive a natural language query 230 from a user. As mentioned above, natural language query 230 includes a phrase, sentence, and/or question that adheres to human language rules. As a result, the user is able to generate natural language query 230 using familiar and/or frequently used skills or techniques.

As shown in FIG. 2, management apparatus 206 obtains natural language query 230 through one or more natural language generation modules 228. In one or more embodiments, natural language generation modules 228 include mechanisms for obtaining or recommending natural language query 230 to the user. For example, natural language generation modules 228 include a search field that allows the user to type in natural language query 230 and/or a voice user interface that converts the user's speech into a text-based representation of natural language query 230. In another example, natural language generation modules 228 include an autocomplete module that displays recommended queries based on a partial query entered by the user (e.g., recommending "who are my connections with jobs at LinkedIn" or "find jobs listed by LinkedIn" when the user inputs "LinkedIn jobs" into the search field). In a third example, natural language generation modules 228 include a related search module that displays related queries for a query (e.g., displaying related queries of "who can refer me to software engineer jobs" and "find software engineer jobs near me" for a query of "software engineer jobs"). In a fourth example, natural language generation modules 228 include a correction module that corrects a mistyped query (e.g., converting a query of "who are my software enginer freinds" into "who are my software engineer friends").

In some embodiments, natural language generation modules 228, management apparatus 206, and/or another component of the system include functionality to classify queries of the online system as natural language queries or keyword queries. In these embodiments, keyword queries include keywords to be matched to data and/or content in the online system instead of phrases, sentences, and/or questions that adhere to human language rules. For example, the component uses a machine language model to classify each query as natural language or keyword-based. If the query is classified as a keyword query, the system processes the query using a keyword-query-processing pipeline. If the query is classified as a natural language query (e.g., natural language query 230), the system processes the query using the techniques described below.

Analysis apparatus 204 applies one or more machine learning models 208 to natural language query 230 to convert natural language query 230 into one or more keyword queries 226 that are performed using one or more verticals 238-240 in the online system. First, analysis apparatus 204 identifies one or more search intentions 222 in text 220 of natural language query 230. In one or more embodiments, search intentions 222 represent different types of searches that can be performed by the user. For example, search intentions 222 include entities that can be searched, such as people, jobs, companies, schools, groups, content, events, and/or other types of entities with entity data 216 in data repository 134.

In some embodiments, some or all search intentions 222 represent individual verticals 238-240 in the online system. Continuing with the above example, search intentions 222 represent searches of products or features related to people, jobs, companies, schools, groups, events, content, sales, marketing, hiring, and/or educational technology in the online system.

Examples of natural language queries with a people search intention include the following:
Who are my friends working at company X?
Who can refer me to a software engineer job at company X?
Show me software engineers that joined company X from company Y
Who jumped from company X to company Y?
Examples of natural language queries with a job search intention include the following:
Find me software engineer jobs at company X.
Who is hiring machine learning engineers?
Show me data scientist jobs in the New York area.
Software Engineer openings.
Looking for a new job
Find a new job
jobs I'm qualified for
Examples of natural language queries with a company search intention include the following:

Which companies have more than 500 employees?
Which companies do my friends work at?
What companies are near me?
What companies are in the software industry?

Examples of natural language queries with a content search intention include the following:
posts by John Smith
articles mentioning John Smith
How many people liked my latest post?
Which of my friends are in the news?
Are there any videos about the tech industry?

One or more search intentions 222 additionally represent searches that cannot be matched to individual verticals 238. For example, search intentions 222 include an ambiguous intention representing a lack of a clear search intention in the natural language query. Example natural language queries with ambiguous intention include "software engineer company X" and/or "Java developer." In another example, search intentions 222 include an out-of-scope search intention that cannot be performed using a vertical and/or component in the online system. Example natural language queries with an out-of-scope intention for an online network include "hello there," "what is the weather?" and "implementing hashmap in Java."

Because natural language queries can have multiple search intentions 222, analysis apparatus 204 uses one or more machine language models 208 to predict the presence of individual search intentions 222 in text 220. For example, analysis apparatus 204 applies a logistic regression model, word embedding model, fastText model, convolutional neural network, recurrent neural network, and/or another type of machine learning model to a bag-of-words, sequential, and/or embedded representation of text 220 in natural language query 230. The machine learning model outputs scores representing predicted likelihoods of search intentions 222 in text 220. In another example, analysis apparatus 204 applies multiple machine learning models 208 to text 220. Each machine learning model separately predicts the likelihood of a corresponding search intention in text 220. In both examples, a search intention is found in natural language query 230 when the search intention has a non-zero likelihood of occurring in text 220 and/or a likelihood of occurring in text 220 that is higher than a threshold.

After text 220 in natural language query 230 is matched to one or more search intentions 222, analysis apparatus 204 applies one or more additional machine learning models 208 to text 220 to generate search parameters 224 related to verticals 238-240 represented by search intentions 222. In one or more embodiments, each search intention and/or corresponding vertical is associated with a different set of potential search parameters (e.g., search parameters 224) that can be used to conduct searches of content or data 202 in the vertical. Each search parameter includes a field representing a named entity in the content and a value of the field. As a result, each machine learning model used by analysis apparatus 204 to generate a set of search parameters 224 from text 220 includes functionality to label or "tag" portions of text 220 with fields associated with content in a corresponding vertical.

For example, analysis apparatus 204 inputs text 220 into a semi-Markov conditional random field model, bidirectional transformer encoder model, and/or another type of named entity recognition (NER) model. The model is trained to identify named entities that can be used as search parameters 224 for content and/or data 202 in a corresponding vertical. As a result, the model outputs one or more "tags" that map words and/or phrases in text 220 to corresponding named entities and/or fields in search parameters 224. Analysis apparatus 204 optionally matches one or more keywords in the tags and/or other portions of text 220 to methods, functions, and/or calls that can be used to "translate" the keywords into more concrete or specific values of the corresponding search parameters 224. As a result, analysis apparatus 204 and/or the NER model perform slot filling that extracts portions of text 220 corresponding to various "slots" within a semantic frame that can be used to perform a search of the vertical.

Continuing with the above example, possible search parameters 224 and/or slots for a search of a vertical related to people in an online system include, but are not limited to, a first name, a last name, a current company, one or more previous companies, a current school, one or more previous schools, one or more skills, a location, a list of titles, and/or a type of connection (e.g., first-degree connections, second-degree connections, third-degree connections, etc.). Analysis apparatus 204 applies a NER model for the people vertical to text 220 of "Who are my friends working at Company X?" to obtain the following mappings of fields in search parameters 224 to values of the fields in text 220:
First Name: none
Last Name: none
Current Position: none
Previous Positions: none
Current School: none
Previous Schools: none
Company: Company X
Company: none
Titles: none
Skills: none
Location: none
Connection Type: first degree Analysis apparatus 204 applies the same NER model to text 220 of "Who is the CEO of Company Y?" to obtain the following mappings of fields in search parameters 224 to values of the fields in the people search:
First Name: none
Last Name: none
Current Position: none
Previous Positions: none
Current School: none
Previous Schools: none
Current Company: Company Y
Previous Company: none
Titles: CEO
Skills: none
Location: none
Connection Type: none Continuing with the above example, possible search parameters 224 and/or slots for a search of a vertical related to jobs in an online system include, but are not limited to, a title, company name, seniority, location, industry, role, function, compensation, job type (e.g., full-time, part-time, temporary, internship, unpaid, etc.), skills, education, and/or benefits. Analysis apparatus 204 applies a NER model for the jobs vertical to text 220 of "find software engineer jobs near me" to obtain the following mappings of fields in search parameters 224 to values of the fields in the job search:
Title: software engineer
Company name: none
Seniority: none
Location: me
Industry: none
Role: none
Function: none Compensation: none
Job Type: none
Skills: none
Education: none
Benefits: none Analysis apparatus 204 additionally identifies the keyword of "me" in the "Location" field and uses a call, function, and/or another mechanism to resolve the location (e.g., city, region, zip code, etc.) of the user that submitted natural language query 230 and replace the keyword with the user's location.

In one or more embodiments, model-creation apparatus 210 creates and/or updates machine learning models 208 based on training data that includes text 212 and labels 214 from data repository 134 and/or another data store. In some embodiments, text 212 includes samples of natural language queries previously submitted by users to the system and/or a crowdsourcing platform. Text 212 optionally includes expansions of natural language queries from the users into alternative forms. For example, model-creation apparatus 210 and/or another component of the system expand a natural language query of "find me software engineers at company X" by substituting "company X" in the query with other company names and/or "software engineers" in the query with other job titles.

Labels 214 include search intentions 222 related to the natural language queries, which can be generated manually (e.g., through a crowdsourcing platform). When a natural language query is associated with a number of expansions, one or more labels 214 representing search intentions 222 in the natural language query are propagated to expansions of the natural language query.

Labels 214 also, or instead, include fields in search parameters 224 for different searches that can be performed using verticals 238-240. As with labels 214 for search intentions 222, labels 214 that map words or phrases in natural language queries to fields in search parameters 224 are generated manually and/or based on the query expansion techniques described above. For example, the natural language query of "find me software engineers at company X" includes a label of "title" for the phrase "software engineers" and a label of "company" for the phrase "company X." The label of "title" is also assigned to other job titles that are used in lieu of "software engineers" in expansions of the natural language query, and the label of "company" is also assigned to other company names that are used in lieu of "company X" in expansions of the natural language query.

In one or more embodiments, model-creation apparatus 210 uses text 212 in natural language queries and labels 214 representing search intentions 222 to create and/or update one or more machine learning models 208 that predict search intentions 222 in the natural language queries. Model-creation apparatus 210 also uses text 212 and labels 214 representing fields in search parameters 224 for different types of searches and/or search intentions 222 to create and/or update one or more machine learning models 208 that predict search parameters 224 in the natural language queries. For example, model-creation apparatus 210 inputs representations of text 212 and the corresponding labels 214 into each machine learning model. Model-creation apparatus 210 then uses a training technique and/or one or more hyperparameters to update parameter values of machine learning models 208 so that predictions outputted by machine learning models 208 reflect the corresponding labels 214.

After machine learning models 208 are trained and/or updated, model-creation apparatus 210 stores parameters of machine learning models 208 in a model repository 236. For example, model-creation apparatus 210 replaces old values of the parameters in model repository 236 with the updated parameters, or model-creation apparatus 210 stores the updated parameters separately from the old values (e.g., by storing each set of parameters with a different version number of the corresponding machine learning model). In turn, analysis apparatus 204, management apparatus 206, and/or other components of the system retrieve the latest versions of machine learning models 208 from model-creation apparatus 210 and/or model repository 236 and use machine learning models 208 to predict search intentions 222, search parameters 224, and/or other attributes of natural language query 230 and/or other natural language queries received via natural language generation modules 228.

After analysis apparatus 204 uses machine learning models 208 to generate search intentions 222 and search parameters 224 associated with text 220, analysis apparatus 204 converts search parameters 224 into keyword queries 226 that are performed using different verticals 238-240 in the online system. For example, analysis apparatus 224 obtains search parameters 224 that include mappings of possible fields in a search of a given vertical (e.g., people, jobs, content, companies, schools, etc.) to values of the fields extracted from text 220 of natural language query 230. Analysis apparatus 204 converts the fields and values into a representation of a keyword query that is compatible with a search module and/or search interface for the vertical. Analysis apparatus 204 transmits the keyword query to the vertical and receives, in response to the keyword query, a set of results (e.g., results 242-244) containing content that matches search parameters 224 in the keyword query. Analysis apparatus 204 repeats the process with other non-empty sets of search parameters 224 extracted from natural language query 230 for other search intentions 222.

Management apparatus 206 combines results 242-244 related to natural language query 230 from multiple verticals 238-240 into a ranking 232. In some embodiments, management apparatus 206 applies an additional machine learning model from model-creation apparatus 210 and/or model repository 236 to features related to results 242-244, natural language query 230, and/or the user to obtain a set of ranking scores for results 242-244. Each ranking score represents the relevance of each result to the user and/or natural language query 230 and/or the likelihood of a positive outcome between the user and each search result, given an impression of the search result by the user. Management apparatus 206 generates ranking 232 of results 242-244 by descending ranking score and uses a set of rules, filters, and/or exceptions to update ranking 232 (e.g., based on business requirements, user preferences, impression discounting, diversification of content, and/or other goals, strategies, or priorities).

Management apparatus 206 and/or the machine learning model optionally generate ranking 232 to reflect the predicted likelihoods of search intentions 222 in text 220 (e.g., so that search intentions 222 with higher predicted likelihoods have more results in ranking 232 and/or higher-ranked results in ranking 232 than search intentions 222 with lower predicted likelihoods). For example, text 220 of "Who can refer me to a software engineer job?" results in a predicted likelihood of 0.6 for a job search intention and a predicted likelihood of 0.4 for a people search intention. As a result, management apparatus 206 populates 60% of ranking 232 and/or a certain number of positions in ranking 232 with results from a job search generated from text 220 and 40% of ranking 232 and/or the number of positions in ranking 232 with results from a people search generated from text 220.

Finally, management apparatus 206 outputs some or all of ranking 232 as a final set of search results 234 for natural language query 230. For example, management apparatus 206 paginates portions of the updated ranking 232 into subsets of search results 234 that are displayed as the user scrolls through results 234 and/or navigates across screens or pages containing results 234. Subsequent responses and/or outcomes related to results 234 are, in turn, used to generate events that are fed back into the system (e.g., via event streams 220) and used to update machine learning models 208, search intentions 224, search parameters 224, and/or results 234 for subsequent natural language queries.

By identifying search intentions associated with natural language queries and matching the search intentions to verticals that are used to generate results related to the natural language queries, the disclosed embodiments adapt natural language search to online systems with data and/or functionality provided by different components or features of the online systems. In turn, users are able to express their searches and/or search intentions using natural language phrases and/or sentences, which reduces ambiguity in the users' searches and/or complexity in searching the online systems. In addition, the use of machine learning models to extract search parameters related to each vertical from the natural language queries allows the search parameters to be adapted to the context of each vertical. Combining search results from multiple verticals into a single ranking that is returned in response to each natural language query further allows users to efficiently perform natural language searches across the components and/or features of the online systems instead of using multiple queries and/or search modules to search different components and/or features of the online systems.

In contrast, conventional techniques lack the ability to perform natural language searches of online systems that provide different sets of features, data, and/or search results using separate verticals and/or components. Instead, the conventional techniques perform keyword searches of the online systems, which return ambiguous or irrelevant search results when keywords entered in the searches by users apply to multiple entities and/or search intentions. When a user receives search results for a keyword search that lack relevance to the user's search intentions, the user may be required to repeatedly reformulate the keyword search and resubmit the keyword search to an online system until the relevance of the search results improve. In turn, the online system incurs additional computational overhead in processing the additional keyword searches, which reduces the online system's bandwidth and/or ability to perform other types of processing.

The conventional techniques also, or instead, allow the users to perform structured searches, in which the users interact with drop-down menus, checkboxes, radio buttons, form fields, sliders, and/or other user-interface elements to specify the types of data to search and/or values, ranges of values, filters, and/or other representations of entities that are found in the data. Such structured searches involve user interaction with unintuitive and/or difficult-to-use user-interface elements and require additional computational resources and/or bandwidth to generate the user-interface elements and/or process input received through the user-interface elements. Consequently, the disclosed embodiments improve computer systems, applications, user experiences, tools, and/or technologies related to performing and/or processing searches.

Those skilled in the art will appreciate that the system of FIG. 2 may be implemented in a variety of ways. First, analysis apparatus 204, model-creation apparatus 210, management apparatus 206, data repository 134, and/or model repository 236 may be provided by a single physical machine, multiple computer systems, one or more virtual machines, a grid, one or more databases, one or more filesystems, and/or a cloud computing system. Analysis apparatus 204, model-creation apparatus 210, and management apparatus 206 may additionally be implemented together and/or separately by one or more hardware and/or software components and/or layers.

Second, a number of models and/or techniques may be used to generate search intentions 222 and/or search parameters 224. For example, the functionality of machine learning models 208 may be provided by regression models, support vector machines, word embedding models, long short-term memory (LSTM) networks, recurrent neural networks, recursive neural networks, convolutional neural networks, transformers, tree-based models, and/or other types of models that process sequential data and/or text. Multiple versions of each machine learning model may be adapted to different search intentions 222, search parameters 224, verticals 238-240, and/or types of natural language queries, or the same machine learning model may be used to generate predictions of search intentions 222 and/or search parameters 224 in all natural language queries of the online system. The retraining or execution of each machine learning model may further be performed on an offline, online, and/or on-demand basis to accommodate requirements or limitations associated with the processing, performance, or scalability of the system and/or the availability of text 212 and/or labels 214 used to train the machine learning model.

Third, the system of FIG. 2 may be adapted to different types of natural language queries, search intentions 222, search parameters 224, and/or verticals 238-240. For example, the system may be used to process natural language queries of online systems with verticals related to different types of goods or services offered for sale through the online systems and/or different types of entertainment content (e.g., music, television shows, movies, games, etc.) hosted on the online systems.

Figure 3:
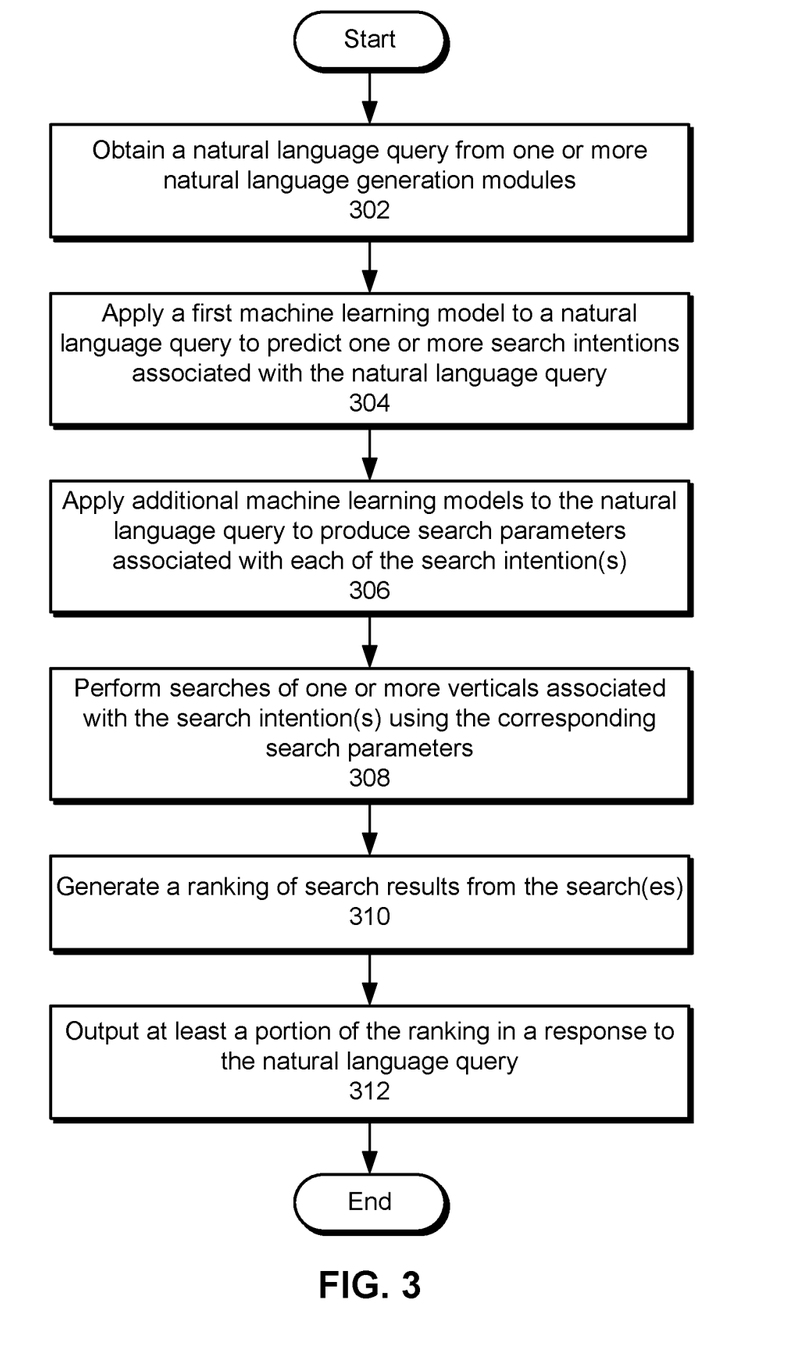
FIG. 3 shows a flowchart illustrating the processing of a natural language query in accordance with the disclosed embodiments.

FIG. 3 shows a flowchart illustrating the processing of a natural language query in accordance with the disclosed embodiments. In one or more embodiments, one or more of the steps may be omitted, repeated, and/or performed in a different order. Accordingly, the specific arrangement of steps shown in FIG. 3 should not be construed as limiting the scope of the embodiments.

Initially, a natural language query is obtained from one or more natural language generation modules (operation 302). The natural language generation modules include, but are not limited to, an autocomplete module that displays recommended queries based on a partial query, a related search module that displays related queries for a query, a correction module that corrects a mistyped query, and/or a voice recognition module that extracts the natural language query from a voice command Next, a first machine learning model is applied to a natural language query to predict one or more search intentions associated with the natural language query (operation 304). For example, the natural language query is inputted into a regression model, deep learning model, and/or sequence model, and predicted likelihoods of a set of search intentions in the natural language query is obtained as output from the model. The search intentions represent types of data or searches that can be performed using a set of verticals in an online system. For example, the search intentions include people, jobs, companies, schools, and/or content in an online network. The search intentions also include an ambiguous intention representing a lack of a clear search intention and/or an out-of-scope intention that cannot be processed by an existing vertical in the online system.

Additional machine learning models are also applied to the natural language query to produce search parameters associated with each of the search intention(s) (operation 306). For example, the natural language query is inputted into a semi-Markov conditional random field, bidirectional transformer encoder, and/or another NER model for each search intention, and mappings of one or more portions of the natural language query to one or more search parameters associated with the search intention are obtained as output from the NER model. Operation 306 thus extracts a different set of search parameters from the natural language query for each search intention identified in operation 304 and/or for all possible search intentions that can be processed by corresponding verticals in the online system.

Searches of one or more verticals associated with the search intention(s) are then performed using the corresponding search parameters (operation 308). For example, one or more search parameters generated by a machine learning model from the natural language query are converted into a keyword query of a corresponding vertical that contains data or content associated with the search intention. The keyword query is transmitted to the vertical, and search results that match the search parameters in the keyword query are obtained from the vertical. The process is repeated for other verticals and/or search intentions with non-empty search parameters extracted from the natural language query.

A ranking of search results from the search(es) is generated (operation 310), and at least a portion of the ranking is outputted in a response to the natural language query (operation 312). For example, another machine learning model is applied to features for the search results, natural language query, and/or user performing the natural language query to produce ranking scores for the search results. Each ranking score represents the relevance of a corresponding search result to the natural language query and/or user and/or the likelihood of a positive outcome (e.g., click, like, save, conversion, etc.) between the user and the search result, given an impression of the search result by the user. The search results are ranked by descending ranking score, and the ranking is updated based on a set of rules associated with generating search results for natural language queries and/or other types of queries of the online system.

Figure 4:
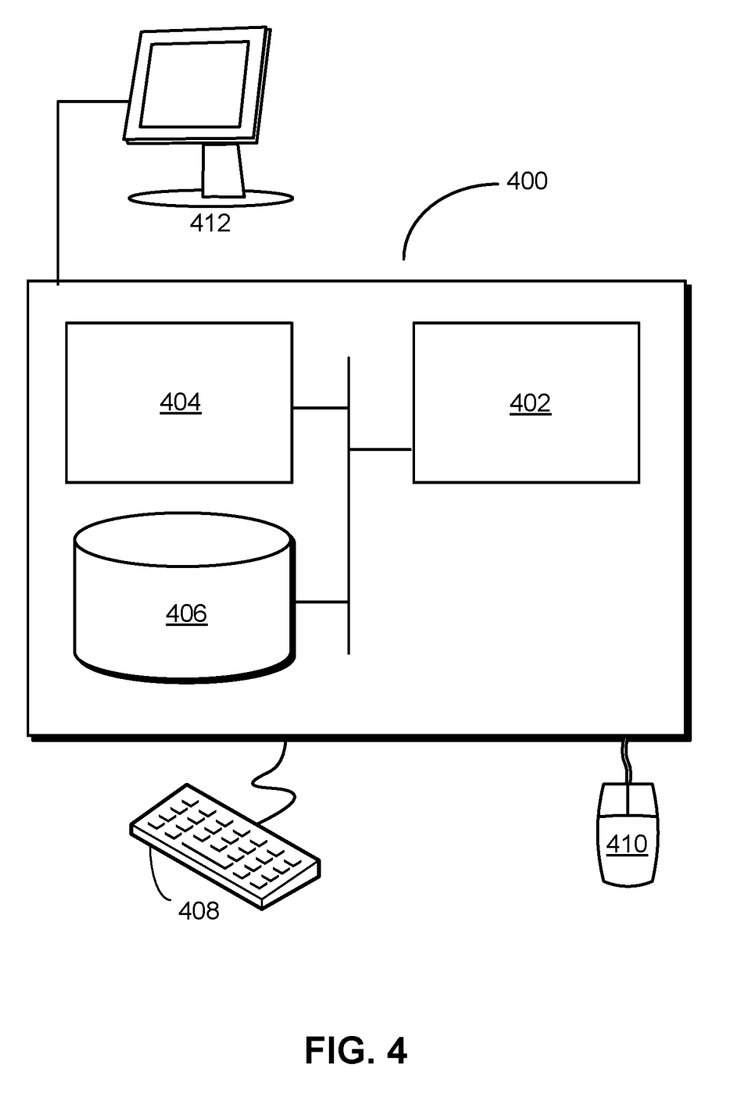
FIG. 4 shows a computer system in accordance with the disclosed embodiments.

FIG. 4 shows a computer system 400 in accordance with the disclosed embodiments. Computer system 400 includes a processor 402, memory 404, storage 406, and/or other components found in electronic computing devices. Processor 402 may support parallel processing and/or multi-threaded operation with other processors in computer system 400. Computer system 400 may also include input/output (I/O) devices such as a keyboard 408, a mouse 410, and a display 412.

Computer system 400 may include functionality to execute various components of the present embodiments. In particular, computer system 400 may include an operating system (not shown) that coordinates the use of hardware and software resources on computer system 400, as well as one or more applications that perform specialized tasks for the user. To perform tasks for the user, applications may obtain the use of hardware resources on computer system 400 from the operating system, as well as interact with the user through a hardware and/or software framework provided by the operating system.

In one or more embodiments, computer system 400 provides a system for performing a natural language search. The system includes an analysis apparatus and a management apparatus, one or more of which may alternatively be termed or implemented as a module, mechanism, or other type of system component. The analysis apparatus applies a first machine learning model to a natural language query to predict one or more search intentions associated with the natural language query. Next, the analysis apparatus applies a second machine learning model to the natural language query to produce search parameters associated with each of the search intentions. The analysis apparatus then performs searches of verticals associated with the search intentions using the corresponding search parameters. Finally, the management apparatus generates a ranking containing search results from the searches of the verticals and outputs at least a portion of the ranking in a response to the natural language query.

In addition, one or more components of computer system 400 may be remotely located and connected to the other components over a network. Portions of the present embodiments (e.g., analysis apparatus, model-creation apparatus, management apparatus, data repository, model repository, online network, etc.) may also be located on different nodes of a distributed system that implements the embodiments. For example, the present embodiments may be implemented using a cloud computing system that generates search results for natural languages searches of a set of remote verticals.

By configuring privacy controls or settings as they desire, members of a social network, a professional network, or other user community that may use or interact with embodiments described herein can control or restrict the information that is collected from them, the information that is provided to them, their interactions with such information and with other members, and/or how such information is used. Implementation of these embodiments is not intended to supersede or interfere with the members' privacy settings.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor (including a dedicated or shared processor core) that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method, comprising:
applying, by one or more computer systems, a first machine learning model to a natural language query to predict one or more search intentions associated with the natural language query;
applying, by the one or more computer systems, a second machine learning model to the natural language query to produce one or more search parameters associated with a first intention in the one or more search intentions, wherein the one or more search parameters comprise a field and a value of the field;
performing, by the one or more computer systems, a first search of a first vertical associated with the first intention using the one or more search parameters;
generating a ranking comprising a first set of search results from the first search of the first vertical; and
outputting at least a portion of the ranking in a response to the natural language query.

2. The method of claim 1, further comprising:
applying a third machine learning model to the natural language query to produce one or more additional search parameters associated with a second intention in the one or more search intentions;
performing a second search of a second vertical associated with the second intention using the one or more additional search parameters; and
generating the ranking to comprise a second set of search results from the second search of the second vertical.

3. The method of claim 2, wherein generating the ranking comprising the first and second sets of search results comprises:
applying a fourth machine learning model to features for the first and second sets of search results to produce ranking scores for the first and second sets of search results; and
generating the ranking of the first and second sets of search results by the ranking scores.

4. The method of claim 3, wherein generating the ranking comprising the first and second sets of search results further comprises:
updating the ranking based on a set of rules associated with generating search results for natural language queries.

5. The method of claim 2, wherein the first and second intentions comprise at least one of:
a people search;
a job search;
a company search; and
a content search.

6. The method of claim 1, wherein applying the first machine learning model to the natural language query to predict the one or more search intentions comprises:
inputting the natural language query into the first machine learning model; and
obtaining, as output from the first machine learning model, predicted likelihoods of the one or more search intentions in the natural language query.

7. The method of claim 1, wherein applying the second machine learning model to the natural language query to produce the one or more search parameters associated with the first intention comprises:
inputting the natural language query into the second machine learning model; and
obtaining, as output from the second machine learning model, mappings of one or more portions of the natural language query to the one or more search parameters.

8. The method of claim 1, further comprising:
obtaining the natural language query from one or more natural language generation modules.

9. The method of claim 8, wherein the one or more natural language generation modules comprise at least one of:
an autocomplete module that displays recommended queries based on a partial query;
a related search module that displays related queries for a query;
a correction module that corrects a mistyped query; and
a voice recognition module that extracts the natural language query from a voice command.

10. The method of claim 1, wherein the second machine learning model comprises a semi-Markov conditional random field.

11. The method of claim 1, wherein the one or more search intentions comprise at least one of:
a type of content requested in the natural language query;
an ambiguous intention representing a lack of a clear search intention; and
an out-of-scope intention that cannot be processed by a vertical.

12. A system, comprising:
one or more processors; and
memory storing instructions that, when executed by the one or more processors, cause the system to:
apply a first machine learning model to a natural language query to predict one or more search intentions associated with the natural language query;
apply a second machine learning model to the natural language query to produce one or more search parameters associated with a first intention in the one or more search intentions, wherein the one or more search parameters comprise a field and a value of the field;
perform a first search of a first vertical associated with the first intention using the one or more search parameters;
generate a ranking comprising a first set of search results from the first search of the first vertical; and
output at least a portion of the ranking in a response to the natural language query.

13. The system of claim 12, wherein the memory further stores instructions that, when executed by the one or more processors, cause the system to:
apply a third machine learning model to the natural language query to produce one or more additional search parameters associated with a second intention in the one or more search intentions;
perform a second search of a second vertical associated with the second intention using the one or more additional search parameters; and
generate the ranking to comprise a second set of search results from the second search of the second vertical.

14. The system of claim 13, wherein generating the ranking comprising the first and second sets of search results comprises:

applying a fourth machine learning model to features for the first and second sets of search results to produce ranking scores for the first and second sets of search results;

generating the ranking of the first and second sets of search results by the ranking scores; and updating the ranking based on a set of rules associated with generating search results for natural language queries.

15. The system of claim 13, wherein generating the ranking comprising the first and second sets of search results comprises:

determining a first proportion of the first set of search results in the ranking based on a first predicted likelihood of the first intention from the first machine learning model and a second proportion of the second search results in the ranking based on a second predicted likelihood of the second intention from the first machine learning model; and generating the ranking to include the first proportion of the first set of search results and the second proportion of the second set of search results.

16. The system of claim 12, wherein applying the first machine learning model to the natural language query to predict the one or more search intentions comprises:

inputting the natural language query into the first machine learning model; and obtaining, as output from the first machine learning model, predicted likelihoods of the one or more search intentions in the natural language query.

17. The system of claim 12, wherein applying the second machine learning model to the natural language query to produce the one or more search parameters associated with the first intention comprises:

inputting the natural language query into the second machine learning model; and obtaining, as output from the second machine learning model, mappings of one or more portions of the natural language query to the one or more search parameters.

18. The system of claim 17, wherein the second machine learning model comprises a semi-Markov conditional random field.

19. A non-transitory computer-readable storage medium storing instructions that when executed by a computer cause the computer to perform a method, the method comprising:

applying a first machine learning model to a natural language query to predict one or more search intentions associated with the natural language query;

applying a second machine learning model to the natural language query to produce one or more search parameters associated with a first intention in the one or more search intentions, wherein the one or more search parameters comprise a field and a value of the field;

performing a first search of a first vertical associated with the first intention using the one or more search parameters;

generating a ranking comprising a first set of search results from the first search of the first vertical; and outputting at least a portion of the ranking in a response to the natural language query.

20. The non-transitory computer-readable storage medium of claim 19, the method further comprising:

applying a third machine learning model to the natural language query to produce one or more additional search parameters associated with a second intention in the one or more search intentions;

performing a second search of a second vertical associated with the second intention using the one or more additional search parameters; and generating the ranking to comprise a second set of search results from the second search of the second vertical.

* * * * *